June 18, 1929.  J. M. McCLATCHIE  1,717,395
HEAT TRANSMISSION COIL
Filed May 10, 1927   3 Sheets-Sheet 2
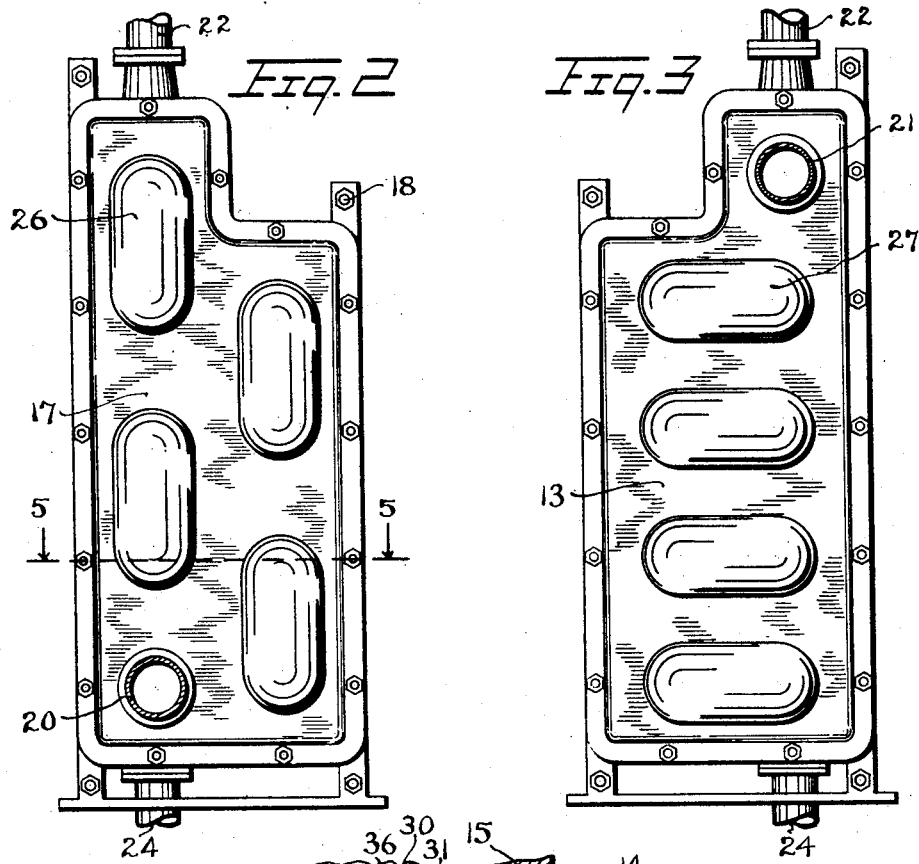
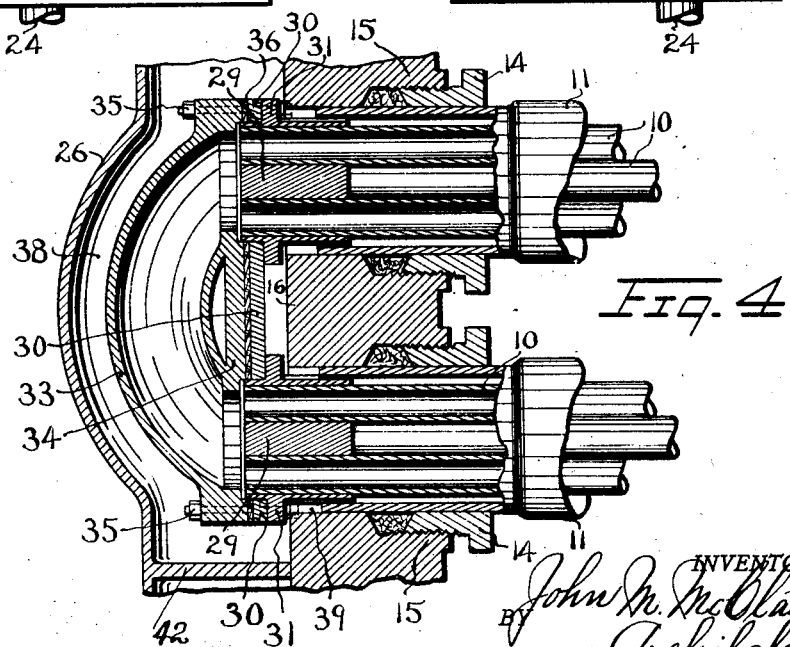
INVENTOR
John M. McClatchie
BY Archibald Coy
ATTORNEY June 18, 1929.  J. M. McCLATCHIE  1,717,395
HEAT TRANSMISSION COIL
Filed May 10, 1927  3 Sheets-Sheet 3
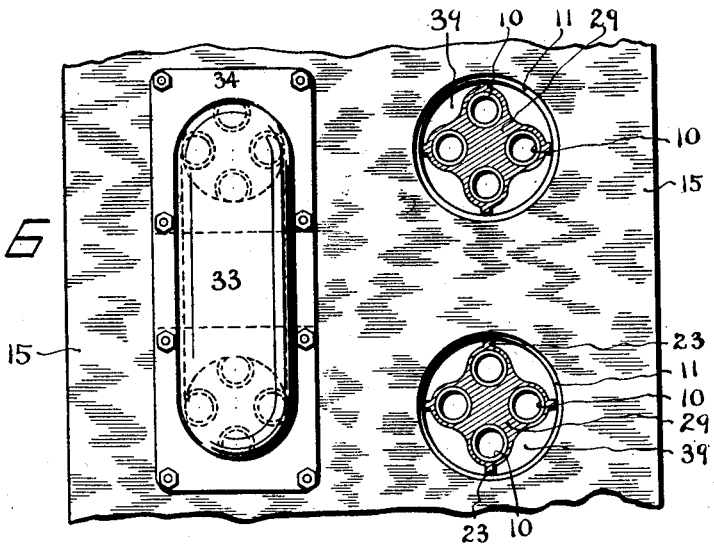
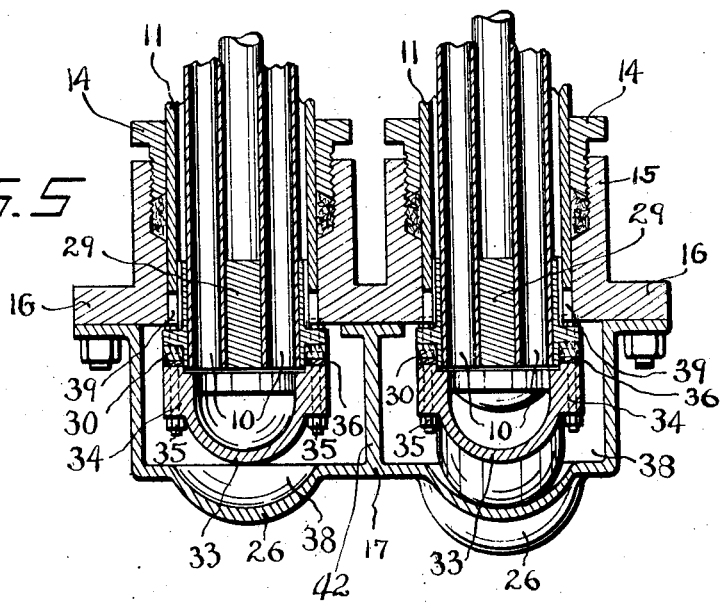
INVENTOR
John M. McClatchie
BY Archibald Cox
ATTORNEY Patented June 18, 1929.

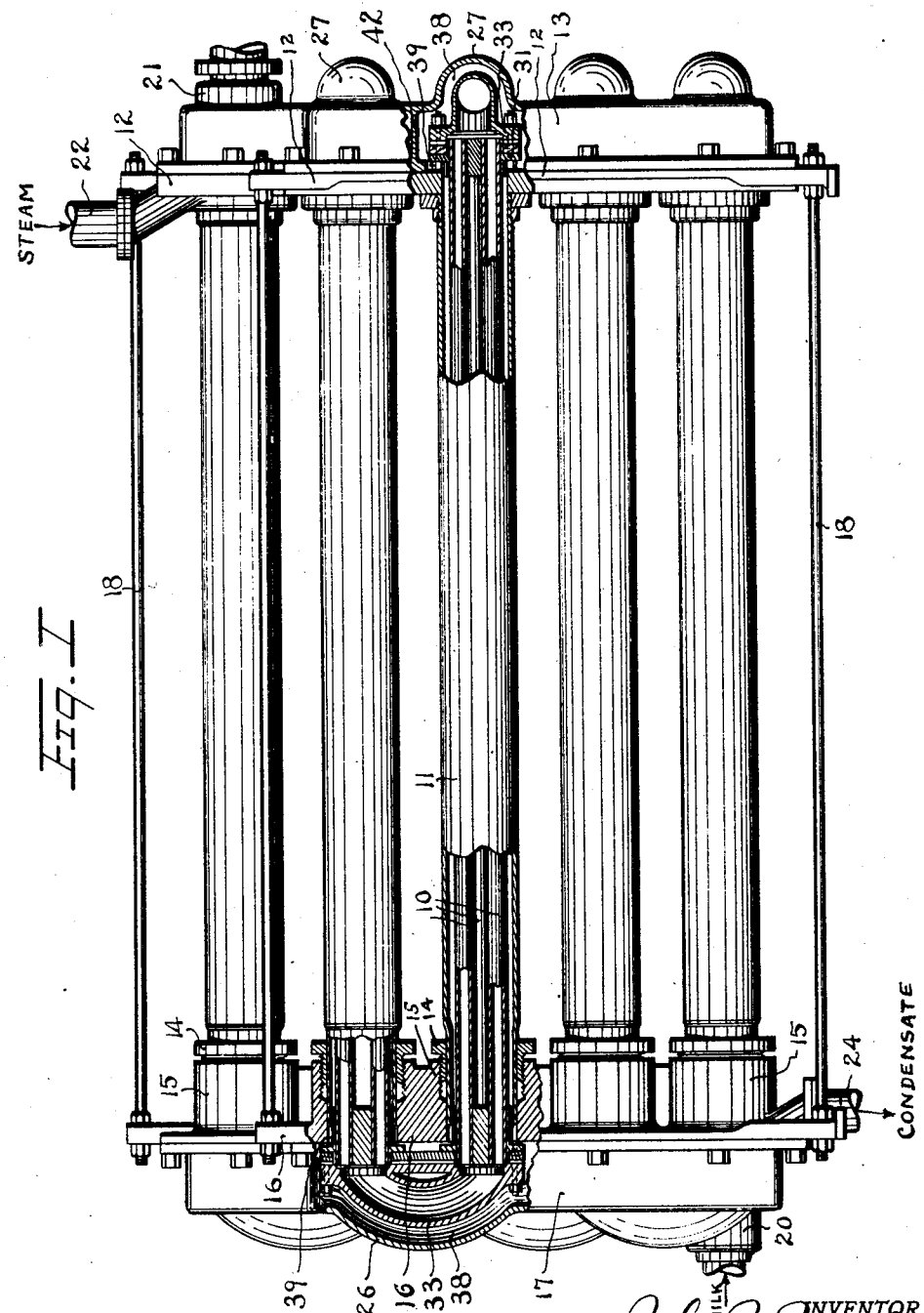

1,717,395

UNITED STATES PATENT OFFICE.

JOHN M. McCLATCHIE, OF NEW YORK, N. Y., ASSIGNOR TO THE BORDEN COMPANY, OF NEW YORK, N. Y., A CORPORATION OF NEW JERSEY.

HEAT-TRANSMISSION COIL.

Application filed May 10, 1927. Serial No. 190,163.

The invention relates to an improvement in heat transmission coils of the type in which the fluid whose temperature is to be changed flows through an inner coil and the heat transmitting medium flows through an outer coil enclosing or surrounding the inner coil, the two fluids usually flowing counter-current to each other.

Heat transmitting coils of this type have been found effective for the purpose of raising or lowering the temperature of liquids. Great difficulty has been experienced, however, in preventing the coils from leaking. The leakage usually occurs at the joints between the inner and outer coils due to the fact that the two coils are subjected to different and varying temperatures and no provision is made for the difference in the linear expansion of the coils. Hence the joints are often strained beyond the holding point and leakage results. The object of the present invention is to produce an improved heat transmission coil of this type having provision permitting one coil to move relatively to the other without effecting the tightness of the joint between them, thereby effectively preventing leakage. To this end the invention consists in the heat transmission coil hereinafter described and particularly pointed out in the appended claims.

In the accompanying drawings illustrating the preferred form of the invention, Fig. 1 is a side elevation, partly in section, of the improved heat transmission coil; Fig. 2 is an end elevation, looking from the left in Fig. 1; Fig. 3 is an end elevation, looking from the right in Fig. 1; Fig. 4 is an enlarged detail of the parts shown in section at the left of the coil in Fig. 1; Fig. 5 is an enlarged section taken on the line 5—5 of Fig. 2; and Fig. 6 is a detail end elevation of a portion of one of the head plates, showing the method of securing the inner coil manifold heads thereto.

The heat transmission coil of the present invention is adapted for changing the temperature of many kinds of liquids, either lowering or raising the temperature to a predetermined point. For the sake of the present description and because the heat transmission coil shown in said application is used for preheating the milk before it enters the vacuum pan, it will be assumed throughout this specification that the improved coil is used for the purpose of raising the temperature of milk to a predetermined point. The improved heat transmission coil as illustrated in the drawings comprises an inner coil through which the milk passes and an outer coil enclosing the inner coil and through which the steam or other heating fluid passes. Each section or unit of the inner coil consists of four relatively small milk tubes 10, and each section or unit of the outer coil consists of a tube or steam jacket 11 enclosing the four milk tubes constituting a section or unit of the inner coil. The outer tubes 11 are secured at one end to the plate 12 of a head or manifold 13, and are free to move axially at their other ends in the glands 14 threaded into the stuffing boxes 15 extending inwardly from a plate 16 which is secured to the head or manifold 17. The plates 12 and 16 are held spaced apart a fixed distance by the rods 18.

In the arrangement of the inner and outer coils, as shown in the drawings, there are two tiers of coils. The flow of the milk in one direction through the inner coil, and the flow of the steam or other heating medium in the opposite direction through the outer coil will be understood by reference to Figs. 1, 2 and 3. The milk enters at the bottom of the coil through the inlet orifice 20 and leaves the coil at the diagonally opposite corner through the outlet orifice 21. The steam enters the coil at the point at which the milk leaves the coil and for this purpose the coil is provided with the steam inlet 22 leading into the outer coil. The condensate is discharged from the coil at the diagonally opposite lower corner through the outlet 24. There is only one unit or section of inner and outer tubes in the top row. In the remaining lower rows there are two units or sections of inner and outer tubes. Except for the upper row of tubes, the milk and the heating fluid flow on a horizontal plane through the two sections of tubes comprising each row before passing respectively either to the next upper or to the next lower row. The milk and steam pass vertically into the next succeeding row of tubes through the sections 26 of the manifold 17, and pass horizontally from one unit of tubes to the other of each row through the sections 27 of the manifold 13.

The four milk tubes 10 of each unit or section of the inner coil are fitted tightly at their ends in a head 29 which is star-shaped in cross-section, as shown in Fig. 6, to provide space between its periphery and the inner surface of the surrounding tube 11 for the passage of the heating medium. The inner ends of the heads 29 extend inwardly into the outer ends of the tubes 11 and are provided with the ribs or guides 23 which bear loosely upon the inner surface of the tubes 11 to permit each unit of tubes 10 and its enclosing tube 11 to move relatively to each other. The outer end of each head 29 fits tightly in a plate 30 spanning two adjacent sets of milk tubes 10. The plates 30 in the manifold 17 are vertically arranged and span the two adjacent series of tubes connecting through the sections 26, and the plates 30 in the manifold 13 are horizontally arranged and span the two groups of tubes connecting through the sections 27.

Each head 29 is provided with an annular flange 31 which bears against the inner surface of its plate 30. The connection between each two consecutive groups of inner tubes is made through an arc-shaped channel section or return bend 33 having a flat inner face 34 adapted to fit against the plate 30 to which it is secured by the bolts 35. A tight joint is established between the plate 30 and the head 33 by means of a gasket 36. The channel sections or return bends 33 serve to establish communication between the discharge end of one section of inner milk tubes and the inlet end of the next section of milk tubes. As is the case of the plates 30, the heads 33 located in the sections 26 of the manifold 17 are vertically arranged and the heads 33 located in the sections 27 of the manifold 13 are horizontally arranged. The communication between the discharge end of an outer tube 11 and the inlet end of the next tube 11 is made through the sections 26 and 27 which correspond in shape to the outer sides of the channel section 33 and are spaced apart therefrom to provide the passageways 38. The steam or other heating fluid passes from the passageways 38 into the tubes 11 surrounding the tubes 10 and from the tubes 11 into the passageways 38 through the spaces 39 between the flanges 31 and the base plates 12 and 16 of the manifolds 13 and 17. Each channel section 33 and its covering section 26 and 27 is isolated from its neighbor by means of the partition walls 42.

By arranging the outer tubes 11 at one end so that they are free to move axially in either direction, and by mounting the ends of the inner or milk tubes in heads which are free to move axially in either direction in the outer tubes, a heating coil for milk is provided which readily accommodates itself to the various conditions of operation. The linear expansion and contraction of the inner and outer tubes according to the relative amount of heat to which they are subjected permit the different sections of the coil to adjust themselves without imposing a fracturing strain on the metal.

By the use of this coil the milk or other liquid flowing through it is gradually raised to the predetermined temperature in such manner that all portions or unit quantities of the milk are subjected to the same temperature for the same length of time, thereby assuring a batch of milk of uniform texture and quality. By properly adjusting the velocity with which the milk runs through the coil with respect to the steam pressure at the steam inlet 22, the difference in temperature between the milk and the heating medium may be controlled so that it will not exceed more than a few degrees. This result is secured in the following manner: The cold fluid milk enters the bottom of the coil at the milk inlet 20 and passes upwardly through the inner tubes 10. The steam at two or three pounds pressure enters at the upper end of the coil and passes downwardly. After the apparatus has been in use for a short period so that it is functioning normally the lower sections of the outer coil are filled with condensate, whereas the upper sections of the outer coil are filled with live steam. The head under which the condensate leaves the outlet 24 at the lower end of the outer coil causes a partial vacuum to be formed in the middle sections, so that in this part of the coil there is steam at a reduced temperature, perhaps 189° F. The live steam entering the inlet 22 has a temperature of about 216° F. It is thus clear that the temperature of the heating medium in the tubes of the outer coil gradually increases from the outlet for the condensate at the lower end of the coil to the inlet for the live steam at the upper end of the coil. Consequently as the milk flows upwardly through the inner coil in contact with the inner surfaces of the milk tubes it is gradually and progressively heated to the requisite temperature by the time it reaches the milk outlet 21. By keeping the difference in temperature between the milk and the heating medium small, the amount of coating of milk on the inner surfaces of the inner tubes is reduced to a minimum, it being possible to conduct a whole day's run without enough coating of milk gathering to interfere with the proper heating of the milk. Moreover, it will be observed that by reason of the fact that the inner tubes are relatively small in diameter, all portions or unit quantities of the milk are subjected to substantially the same amount of heat for exactly the same length of time.

Having thus described the invention what I claim as new is:—

1. A heat transmission coil comprising, two manifolds held apart in spaced relation, a plurality of outer tubes fixed in one manifold and movably connected with the other, a plurality of relatively small inner tubes located in each outer tube, a head in which the ends of each group of inner tubes are fixed, each head being slidingly received in the outer end of an outer tube, channel sections located in the manifolds, each channel section having two heads secured to it, each channel section establishing communication between the ends of one group of inner tubes and the ends of the adjacent group of inner tubes to constitute a continuous passage through the inner tubes, and partition walls in the manifolds to isolate the channel sections from each other and constitute a continuous passage through the outer tubes.

2. A heat transmission coil comprising, two manifolds held apart in spaced relation, a plurality of tiers of outer tubes extending from one manifold to the other, a plurality of relatively small inner tubes located in each outer tube, a head in which the ends of each group of inner tubes are fixed, each head being slidingly mounted in the outer end of an outer tube, a plurality of channel sections located in the manifolds, each channel section establishing a passage from the ends of one group of inner tubes to the ends of the adjacent group of inner tubes to constitute a continuous passage through the inner tubes, the channel sections in one manifold being vertically arranged to connect two adjacent groups of inner tubes arranged on a vertical plane, the channel sections in the other manifold being horizontally arranged to connect the ends of two adjacent groups of inner tubes arranged on a horizontal plane, and partition walls in the manifolds isolating the channel sections from one another to constitute the continuous passage through the outer tubes.

3. A heat transmission coil comprising, two manifolds held apart in spaced relation, a plurality of outer tubes extending from one manifold to the other, a plurality of relatively small inner tubes located in each outer tube, a star-shaped head in which the ends of each group of inner tubes are fixed, each head being provided at its inner end with guides slidingly engaging the inner surface of the outer end of an outer tube, the outer end of each head being provided with an annular flange located in the manifold, a plate having a hole in each end spanning the ends of two adjacent heads and bearing against the outer surfaces of the annular flanges of the heads, a channel section bearing against the outer surface of each plate and establishing communication from the ends of one group of inner tubes to the ends of the adjacent group of inner tubes, and partition walls in the manifolds isolating the channel sections from each other and constituting a continuous passage through the outer tubes.

JOHN M. McCLATCHIE.